(12) United States Patent
Tagami

(10) Patent No.: US 9,336,813 B2
(45) Date of Patent: May 10, 2016

(54) THERMAL-ASSISTED MAGNETIC RECORDING DEVICE CAPABLE OF WRITING MAGNETIC PATTERNS ON LOWER MULTI-STEP DRIVING SIGNALS

(71) Applicant: Kabushiki Kaisha Toshiba, Minato-ku, Tokyo (JP)

(72) Inventor: Naoki Tagami, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/605,586

(22) Filed: Jan. 26, 2015

(65) Prior Publication Data

US 2016/0035383 A1 Feb. 4, 2016

(30) Foreign Application Priority Data

Aug. 1, 2014 (JP) .................................. 2014-158031

(51) Int. Cl.
*G11B 11/00* (2006.01)
*G11B 7/1263* (2012.01)
*G11B 5/012* (2006.01)
*G11B 5/09* (2006.01)
*G11B 5/00* (2006.01)

(52) U.S. Cl.
CPC .............. *G11B 7/1263* (2013.01); *G11B 5/012* (2013.01); *G11B 5/09* (2013.01); *G11B 2005/0021* (2013.01)

(58) Field of Classification Search
None
See application file for complete search history.

(56) References Cited

U.S. PATENT DOCUMENTS

| 4,843,604 A * | 6/1989 | Fujiwara et al. ............... 369/116 |
| 5,331,612 A | 7/1994 | Murakami et al. |
| 5,428,594 A * | 6/1995 | Izumi et al. ...................... 369/99 |
| 6,714,230 B2 * | 3/2004 | Shimizu ......................... 347/224 |
| 6,826,129 B1 * | 11/2004 | Matsuura ..................... 369/13.14 |
| 2002/0041539 A1 * | 4/2002 | Kimura et al. .............. 369/13.17 |
| 2005/0213436 A1 * | 9/2005 | Ono et al. ................... 369/13.02 |
| 2006/0114591 A1 | 6/2006 | Taguchi et al. |
| 2009/0296257 A1 * | 12/2009 | Nakano et al. .................. 360/71 |
| 2012/0243390 A1 * | 9/2012 | Lennard et al. ............ 369/13.24 |
| 2015/0146506 A1 * | 5/2015 | Krichevsky et al. ........ 369/13.24 |

FOREIGN PATENT DOCUMENTS

| JP | H05-40974 A | 2/1993 |
| JP | H10-31850 A | 2/1998 |
| JP | 2867993 B2 | 3/1999 |
| JP | 2012-053950 A | 3/2012 |

* cited by examiner

*Primary Examiner* — Tan X Dinh
(74) *Attorney, Agent, or Firm* — White & Case LLP

(57) ABSTRACT

According to one embodiment, there is provided a magnetic disk device including a light irradiation element and a control unit. The light irradiation element is configured to irradiate a magnetic disk with light according to a driving signal. The control unit is configured to lower, in multistep manner, active level of the driving signal contributing intensity of the light when a low frequency pattern of write data is recorded into the magnetic disk.

13 Claims, 13 Drawing Sheets

(A)

THERMAL-ASSISTED MAGNETIC RECORDING DEVICE CAPABLE OF WRITING MAGNETIC PATTERNS ON LOWER MULTI-STEP DRIVING SIGNALS

CROSS-REFERENCE TO RELATED APPLICATIONS

This application is based upon and claims the benefit of priority from Japanese Patent Application No. 2014-158031, filed on Aug. 1, 2014; the entire contents of which are incorporated herein by reference.

FIELD

Embodiments described herein relate generally to a magnetic disk device, a preamplifier, and a control method.

BACKGROUND

In recent years, a thermal-assisted magnetic recording scheme is received a lot of attention as a technology of making high-density magnetic recording enable. The thermal-assisted magnetic recording scheme converts a laser beam generated by a light source (a laser diode) into a near-field light beam using a light irradiation element (a near-field element), and irradiates a part of a recording layer of a magnetic disk with the light beam to locally raise the temperature of the magnetic disk. Then, the heated portion is applied with a magnetic field by a magnetic write head to magnetically record data. It is desirable that the data recorded by the thermal-assisted magnetic recording scheme be improved in reliability.

DETAILED DESCRIPTION

In general, according to one embodiment, there is provided a magnetic disk device including a light irradiation element and a control unit. The light irradiation element is configured to irradiate a magnetic disk with light according to a driving signal. The control unit is configured to lower, in multistep manner, active level of the driving signal contributing intensity of the light when a low frequency pattern of write data is recorded into the magnetic disk.

Exemplary embodiments of a magnetic disk device will be explained below in detail with reference to the accompanying drawings. The present invention is not limited to the following embodiments.

(First Embodiment)

Figure 1:
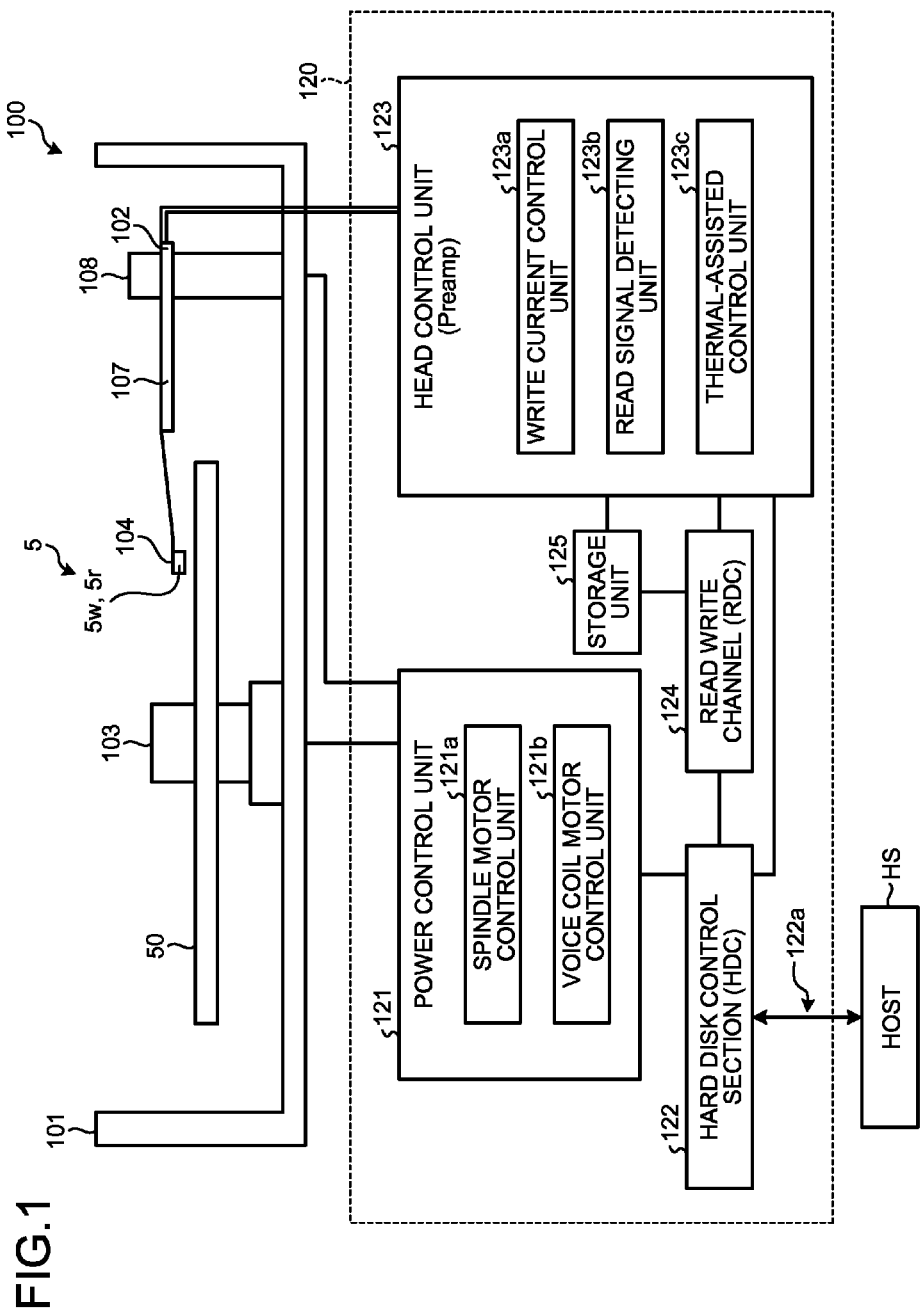
FIG. 1 is a diagram illustrating a configuration of a magnetic disk device according to a first embodiment.
Figure 2:
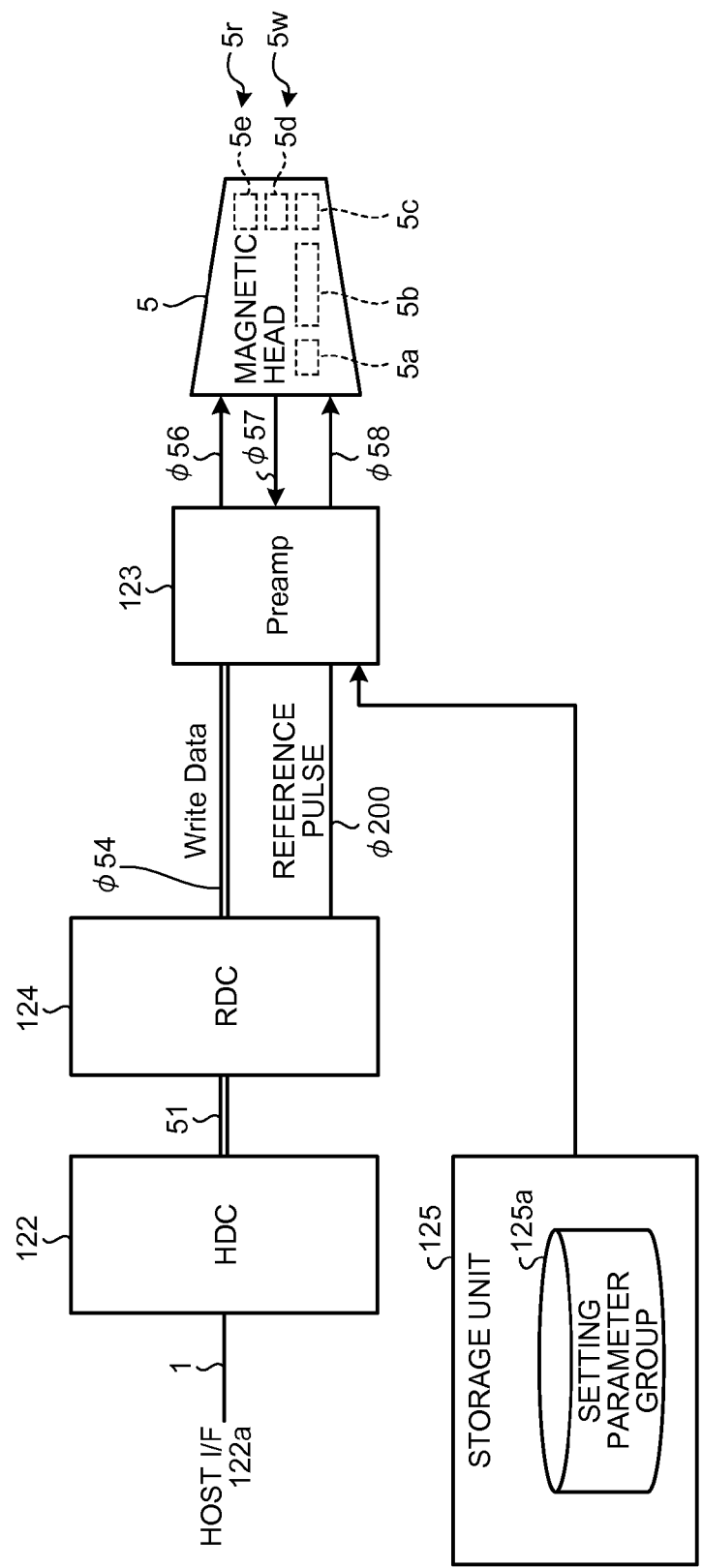
FIG. 2 is a diagram illustrating a configuration related to an RDC in the first embodiment.

The outline of a magnetic disk device 100 according to a first embodiment will be described using FIGS. 1 and 2. FIG. 1 is a diagram illustrating a configuration of the magnetic disk device according to the embodiment. FIG. 2 is a diagram illustrating a configuration relating to data recording by the magnetic disk device according to the embodiment.

A magnetic disk 50 is a recording medium to record various types of information, and is rotatably driven by a spindle motor 103. The magnetic disk 50, for example, includes a plurality of concentric tracks disposed about a rotation center of the spindle motor 103.

A read and write operation to the magnetic disk 50 is performed by a magnetic head 5 which is provided in a head slider 104 at a tip end of an arm 107. The magnetic head 5 includes a write head 5w and a read head 5r.

The magnetic head 5 moves relative to a surface of the magnetic disk 50 in a direction to the down track while maintaining a state of slightly floating from the surface of the magnetic disk 50 by a floating force generated as the magnetic disk 50 rotates. The write head 5w records information on the magnetic disk 50 using a magnetic field generator 5d to be described below.

At this time, as illustrated in FIG. 2, in the write head 5w, a laser beam generated by a light source (for example, a laser diode (LD)) 5a is guided to a near-field element (a light irradiation element) 5c through a waveguide 5b according to a thermal-assisted magnetic recording scheme. The laser beam is converted into a near-field light beam by the near-field element 5c and emitted onto a part of the surface of the magnetic disk 50. The write head 5w applies a magnetic field generated by the magnetic field generator 5d onto a portion of the magnetic disk 50 of which the temperature is locally increased by the near-field light beam from the near-field element 5c, and magnetically records information. For example, the magnetic field generator 5d writes data onto the magnetic disk 50 while inverting a direction of the magnetic field according a bit value (0 or 1) of the writing data. In other words, the write head 5w is used in a write operation which is performed on the magnetic disk 50 according to the thermal-assisted magnetic recording scheme. It should be noted that the light source 5a may be provided on the outside of the magnetic head 5 as long as the laser beam can be supplied to the near-field element (the light irradiation element) 5c through the waveguide 5b. The read head 5r reads the information recorded in the magnetic disk 50 through a magnetoresistive element 5e. In other words, the read head 5r is used in a read operation performed on the magnetic disk 50.

The arm 107 rotates on a circular art about a shaft 108 by a voice coil motor 102 which is provided on another end of the arm 107 illustrated in FIG. 1. Therefore, the write head 5w and the read head 5r seek-moves in a cross-track direction of the magnetic disk 50, and positioned at a target track to be read/written. The magnetic disk 50, the magnetic head 5, the voice coil motor 102, and the spindle motor 103 are housed in a case 101.

Further, the magnetic disk device 100 includes a magnetic recording control unit 120. The magnetic recording control unit 120 includes a head control unit (a preamplifier) 123, a power control unit 121, a read write channel (RDC) 124, a hard disk control section (HDC) 122, and a storage unit 125. The head control unit 123 includes a write current control unit 123a, a read signal detecting unit 123b, and a thermal-assisted control unit 123c. The power control unit 121 includes a spindle motor control unit 121a and a voice coil motor control unit 121b. The storage unit 125, for example, is configured by a nonvolatile memory (ROM, flash memory, FeRAM, MRAM, ReRAM, PRAM, and the like).

The HDC 122 generates a predetermined command and/or data 51 according to a command and/or data 1 received from a host HS through a host I/F 122a, and outputs the predetermined command and/or data to the RDC 124. The RDC 124 performs control according to the received predetermined command and/or data 51. For example, in a case where a write command is received, the RDC 124 generates data $\phi54$ to be written in the magnetic disk 50 and outputs the data to the preamplifier 123.

The storage unit 125 stores a setting parameter group 125a. The setting parameter group 125a includes a plurality of parameters as candidates which are used for adjustment in parameter to be described below.

Figure 3:
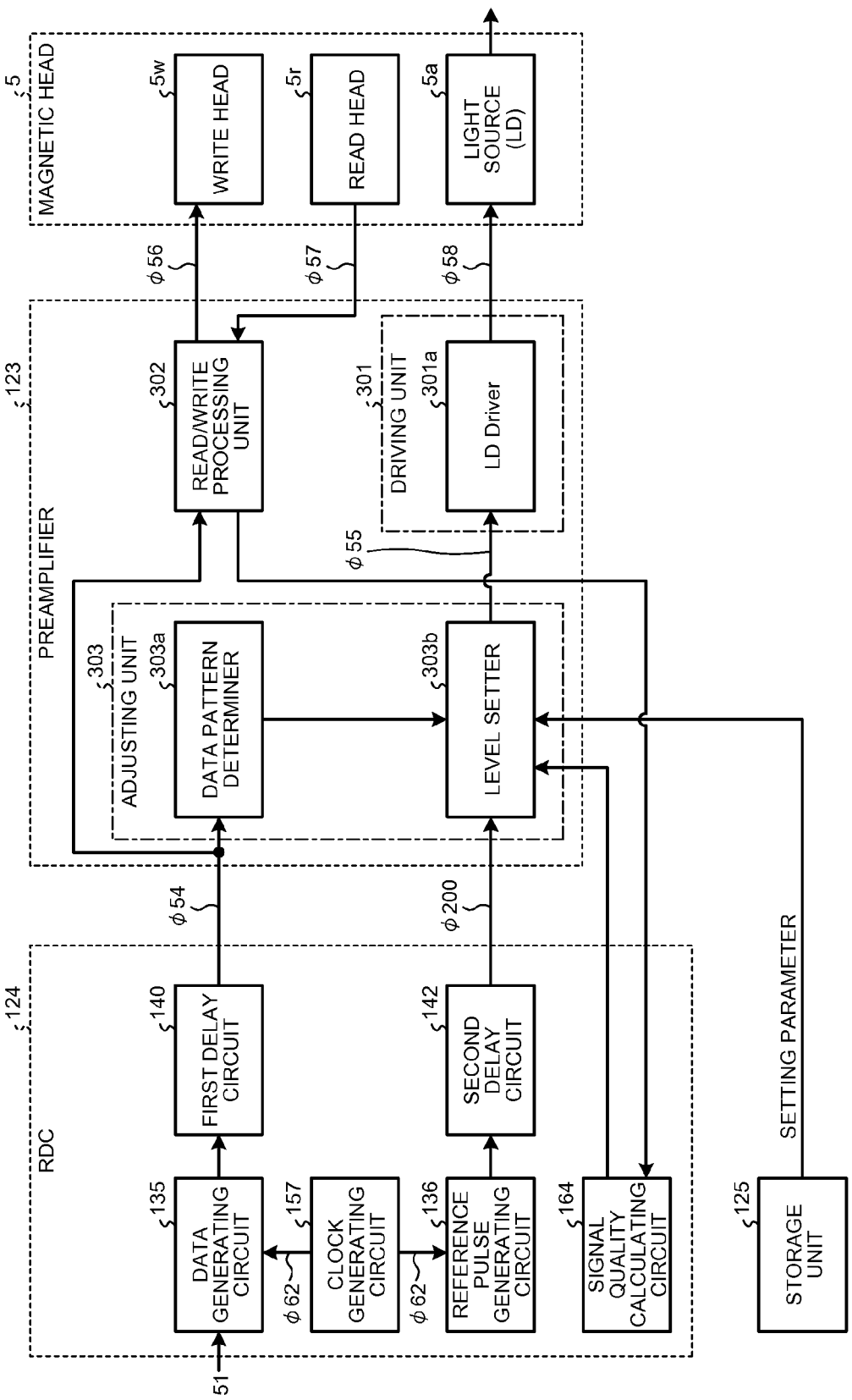
FIG. 3 is a diagram illustrating configurations of the RDC and a preamplifier in the first embodiment.

As illustrated in FIG. 3, the RDC 124 includes a clock generating circuit 157, a data generating circuit 135, a reference pulse generating circuit 136, a first delay circuit 140, and a second delay circuit 142. FIG. 3 is a diagram illustrating configurations of the RDC 124 and the preamplifier 123. The clock generating circuit 157 generates a write clock $\phi62$ and supplies the write clock to the data generating circuit 135 and the reference pulse generating circuit 136. The data generating circuit 135 generates write data $\phi54$ to be written in the magnetic disk 50 in synchronization with the write clock $\phi62$ according to the command and/or data 51. The data generating circuit 135 delays the generated write data $\phi54$ by the first delay circuit 140 and supplies the write data to the preamplifier 123. The reference pulse generating circuit 136 generates a reference pulse $\phi200$ in synchronization with the write clock $\phi62$. The reference pulse $\phi200$ is a reference pulse used when the preamplifier 123 generates a driving current $\phi58$ of the light source (LD) 5a, and a pulse to define a transition time point between a high level and a low level. The reference pulse $\phi200$ has a constant amplitude and a constant period. The reference pulse generating circuit 136, for example, can generate the reference pulse $\phi200$ based on the write clock $\phi62$. The reference pulse generating circuit 136 delays the generated reference pulse $\phi200$ by the second delay circuit 142 and supplies the reference pulse to the preamplifier 123.

In the thermal-assisted magnetic recording scheme, there is performed control in which the magnetic disk 50 is heated by the near-field light beam generated by driving the light source (LD) 5a in a pulse-like manner and a magnetic field generated from the magnetic field generator 5d is adjusted, and records information onto the magnetic disk 50. At this time, it is assumed that control is performed to make a write temperature of the magnetic disk 50 uniformed.

In this case, the preamplifier 123 receives the reference pulse $\phi200$ in synchronization with the write clock $\phi62$. The preamplifier 123 supplies a driving signal (an LD pulse signal) $\phi58$ corresponding to the reference pulse $\phi200$ to the light source (LD) 5a and thus drives the light source (LD) 5a in a pulse-like manner. The near-field element 5c receives light generated by the light source 5a through the waveguide 5b and emits the near-field light beam according to the received light. That is, the near-field element 5c irradiates the magnetic disk 50 with light according to the driving signal. At this time, the write temperature of the magnetic disk 50 is controlled to be uniformed, and the write data $\phi54$ is recorded in the magnetic disk 50.

However, in such a data recording configuration using the pulse driving of the light source (LD) 5a, an appropriate write temperature of each recording bit may be different according to a pattern of the write data $\phi54$. Therefore, when the write temperature of the magnetic disk 50 is controlled to be uniformed, there is a possibility to cause degradation in a read signal quality.

For example, the write data $\phi54$ includes a high frequency pattern HFP and a low frequency pattern LFP (see FIGS. 4A to 4E). The high frequency pattern HFP is a pattern in which bits having the same polarity immediately after the polarity is inverted are included as many as a predetermined period (for example, one bit period 1T). The low frequency pattern LFP is a pattern following the high frequency pattern HFP. In other words, the low frequency pattern LFP is a pattern in which bits having the same polarity continue after the continuation of bits having the same polarity during the predetermined period (for example, one bit period 1T) since the polarity is inverted. In a recording operation of the low frequency pattern LFP, the appropriate write temperature tends to be lowered as it goes from bit B0 toward latter bits B1 to B4.

For example, when being expressed in a format of "Bit Identifier(BitValue)", it is considered a bit pattern arranged in an order of bit B30(0), bit B0(1), bit B1(1), bit B2(1), bit B3(1), and bit B4(1). In such a bit pattern, bit B0(1) corresponds to the high frequency pattern HFP, and bit B1(1) to bit B4(1) correspond to the low frequency pattern LFP. In a case where the write temperature is set to be constant for the high frequency pattern and the low frequency pattern (the case depicted by the broken line in FIG. 4D), the write temperature of bit B0 is appropriately adjusted in the recording operation of the high frequency pattern HFP. On the other hand, in the recording operation of the low frequency pattern LFP, the write temperature is not appropriately adjusted in each of bits B1 to B4. Therefore, the amplitude of a waveform (read wave) of read data $\phi57$ corresponding to the write data $\phi54$ becomes easy to be attenuated in an area where the low frequency pattern LFP is recorded. In other words, the read signal quality is easily degraded (as depicted with the broken line in FIG. 4E)

The followings may be considered as factors to cause the degradation in the read signal quality. In the magnetic disk 50, a magnetostatic interaction with a recorded bit is exerted in a direction to reinvert (destabilize) the recorded bit in an area where bits having the same polarity continue (the recording area of the low frequency pattern LFP). On the other hand, the magnetostatic interaction is exerted in a direction to combine (stabilize) the recording bits in an area where bits having the reverse polarity are adjacent (the recording area of the high frequency pattern HFP). In other words, in the area where the bits having the same polarity continue (the recording area of the low frequency pattern LFP), the write temperature needs not to be increased by an amount according to tendency of easy magnetization inversion due to the magnetostatic interaction. However, in the area where the bits having the reverse polarity are contiguously existed (the recording area of the high frequency pattern HFP), the magnetization inversion is difficult to occur due to the magnetostatic interaction, so that the write temperature is necessarily increased more than the case of the low frequency pattern LFP. Therefore, when the recording operation is uniformly performed on each recording bit by controlling the write temperature of the magnetic disk 50 to be optimized to the high frequency pattern HFP, the write temperature of each bit becomes higher than the appropriated write temperature in the recording area of the low frequency pattern LFP where the recording bits are easily destabilized due to the magnetostatic interaction. Then, surplus thermal energy is unnecessarily applied in the recording operation (magnetization inversion). When the surplus thermal energy is applied, since a coercive force is excessively reduced, the reinversion of magnetization after recording is increased due to the magnetostatic interaction exerting in a direction to reinvert the recorded bit.

For example, in the magnetic disk 50, a bit error caused by variation in position and size of the magnetic particle is reduced by expressing 1-bit information using a plurality of magnetic particles. For example, when being expressed in a format of "Bit Identifier(Bit Value)", it is considered a bit pattern arranged in an order of bit B20(0), bit B10(1), bit B11(1), bit B12(1), bit B13(1), bit B14(1), and bit B15(1). In such a bit pattern, bit B10(1) corresponds to the high frequency pattern HFP, and bit B11(1) to bit B15(1) correspond to the low frequency pattern LFP. Considering the recording operation of the high frequency pattern HFP, a magnetic particle group MG20 of bit B20 and a magnetic particle group MG10 of bit B10 are recorded on the magnetic disk 50 in magnetization directions which are inversed in direction. Therefore, a direction of the magnetostatic interaction which the magnetic particle group MG10 of bit B10 receives from the magnetic particle group MG20 of bit B20 can become substantially equal to the magnetization direction intended to record on the magnetic particle group MG10.

On the other hand, considering the recording operation of the low frequency pattern LFP, each of bits B11 to B15 is recorded in substantially the same magnetization direction as that of an already recorded bit (that is, a bit on the previous side) on the magnetic disk 50. Therefore, the magnetostatic interaction exerted from the magnetic particle group of the already recorded bit to magnetic particle groups MG11 to MG15 of bits B11 to B15 becomes inversed to the magnetization direction intended to record on the magnetic particle group. Further, an absolute value of the energy of the magnetostatic interaction exerted to the magnetic particle group MG15 of bit B15 is increased as large as the magnetostatic interaction is exerted from the magnetic particle group of many more bits to be recorded in substantially the same magnetization direction compared to the magnetostatic interaction exerted to the magnetic particle group MG11 of bit B11.

In other words, the magnetostatic interaction exerted from the already recorded bit tends to be stronger in a direction inversed to the magnetization direction to be recorded as it goes from bit B10 toward latter bits B11 to B15 (the absolute value of the energy becomes large). Therefore, when a thermal intensity (write temperature) of the magnetic disk 50 is controlled to be constant in the recording operation of the low frequency pattern LFP, the magnetostatic interaction is increasingly exerted as it goes from bit B10 toward latter bits B11 to B15, so that the reinversion may easily occur due to the surplus thermal energy. Accordingly, when the magnetization of some of magnetic particles in the magnetic particle group of each bit appearing after bit B0 is reinversed, an amplitude of the waveform of the read data is attenuated, so that the read signal quality is easily degraded.

In the embodiment, when the low frequency pattern of the write data is recorded, an active level of a driving signal contributing to the light emission of the light source is appropriately adjusted (for example, optimized), so that the reinversion is suppressed in the magnetic particle group of each bit of the low frequency pattern and thus the read signal quality is improved. In addition, the active level of the driving signal is a high level in a case where the driving signal is a pulse signal, and a DC level in a case where the driving signal is a DC signal. For example, in the embodiment, when the low frequency pattern is recorded, the active level of the driving signal is controlled to gradually become a small value. It should be noted that in this specification the expression "when . . . is recorded" may mean that "at the timing when . . . is recorded" or may mean that "in a case where . . . is recorded".

Returning to FIG. 3, specifically, the preamplifier 123 includes a read/write processing unit 302, an adjusting unit 303, and a driving unit 301.

The read/write processing unit 302 receives the write data φ54 from the RDC 124. The read/write processing unit 302 generates a write current φ56 according to the write data φ54 and supplies the write current to the magnetic head 5. Therefore, the magnetic field generator 5d (see FIG. 2) of the write head 5w generates a magnetic field according to the write current φ56 to write data in the magnetic disk 50.

The adjusting unit 303 generates a thermal-assisted control signal φ55 using the reference pulse φ200 according to a pattern of the write data φ54. When it is determined that it is a time point to record the high frequency pattern HFP of the write data φ54 into the magnetic disk 50, the adjusting unit 303 generates the thermal-assisted control signal φ55 which makes an instruction to maintain the high level of the LD pulse signal φ58 to be a reference level Lref. When it is determined that it is a time point to record the low frequency pattern LFP of the write data φ54 into the magnetic disk 50, the adjusting unit 303 generates the thermal-assisted control signal φ55 which makes an instruction to appropriately adjust (for example, optimize) the high level of the LD pulse signal φ58.

For example, the adjusting unit 303 includes a data pattern determiner 303a and a level setter 303b. The data pattern determiner 303a receives the write data φ54 as an input, and determines whether the bit pattern of a recording target in the write data φ54 is the high frequency pattern or the low frequency pattern.

When an elapsed time after the polarity of the bit is inverted falls within the predetermined period (for example, one bit period 1T), the data pattern determiner 303a determines that the bit pattern to be recorded is the high frequency pattern. In a case where the bit pattern to be recorded is the high frequency pattern, the data pattern determiner 303a outputs a modulation discrimination signal indicating that the bit pattern is the high frequency pattern toward the level setter 303b.

When the elapsed time after the polarity of the bit is inverted exceeds the predetermined period (for example, one bit period 1T), the data pattern determiner 303a determines that the bit pattern to be recorded is the low frequency pattern. In a case where the bit pattern to be recorded is the low frequency pattern, the data pattern determiner 303a outputs a modulation discrimination signal indicating that the bit pattern is the low frequency pattern toward the level setter 303b.

The level setter 303b receives the reference pulse signal φ200 as an input. Further, the level setter 303b, as to be described below, includes a setting parameter which is previously adjusted, and generates the thermal-assisted control signal φ55 based on the reference pulse signal φ200 according to the setting parameter. The setting parameter includes an amplitude setting value and an attenuation rate setting value. The level setter 303b generates a pulse signal as the thermal-assisted control signal ϕ55 transitioning between the high level and the low level in synchronization with the reference pulse signal ϕ200, and at this time sets the amplitude of the high level according to the amplitude setting value. The level setter 303b supplies the generated thermal-assisted control signal ϕ55 to the driving unit 301.

Figure 4:
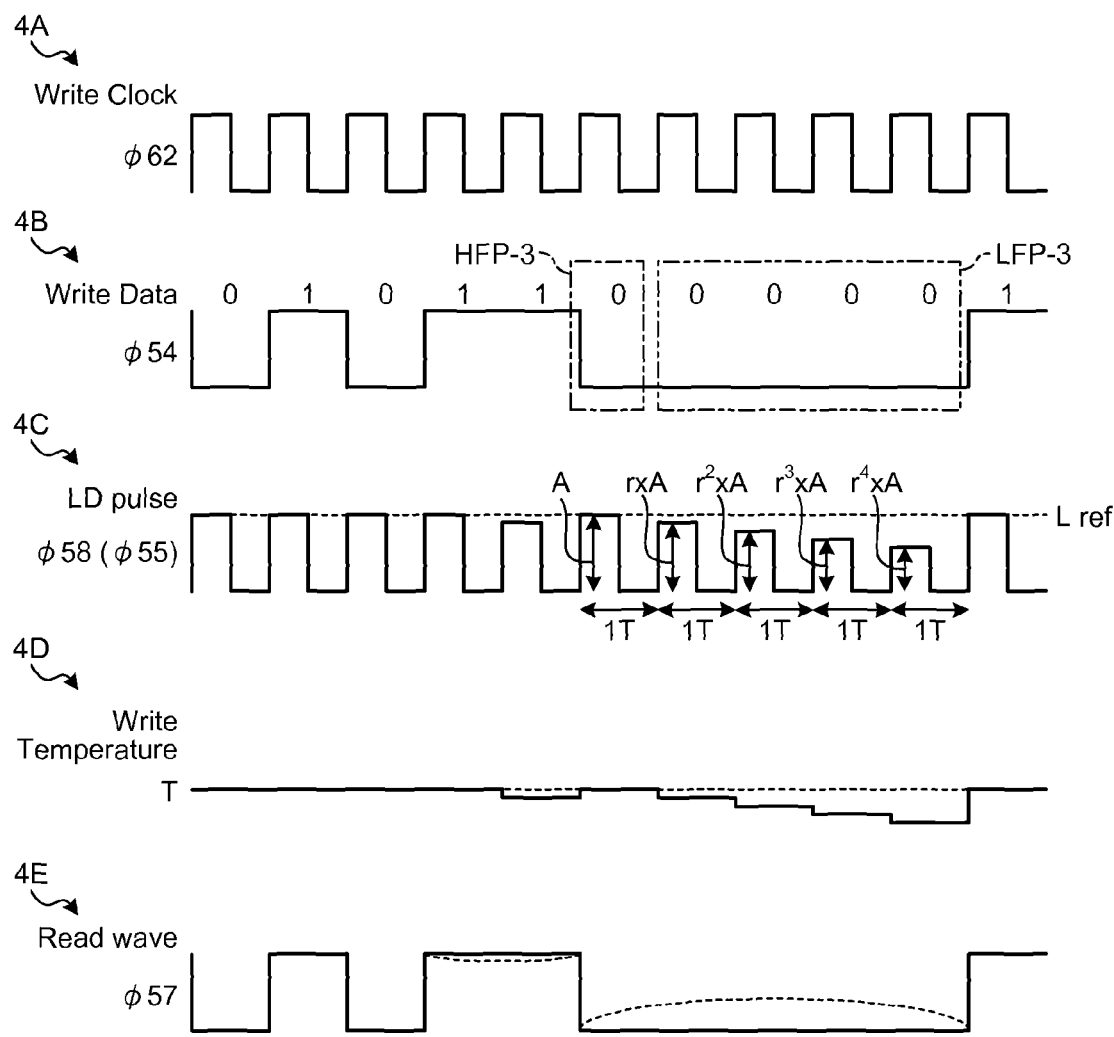
FIG. 4 is a waveform diagram illustrating an operation of the magnetic disk device according to the first embodiment.
Figure 5:
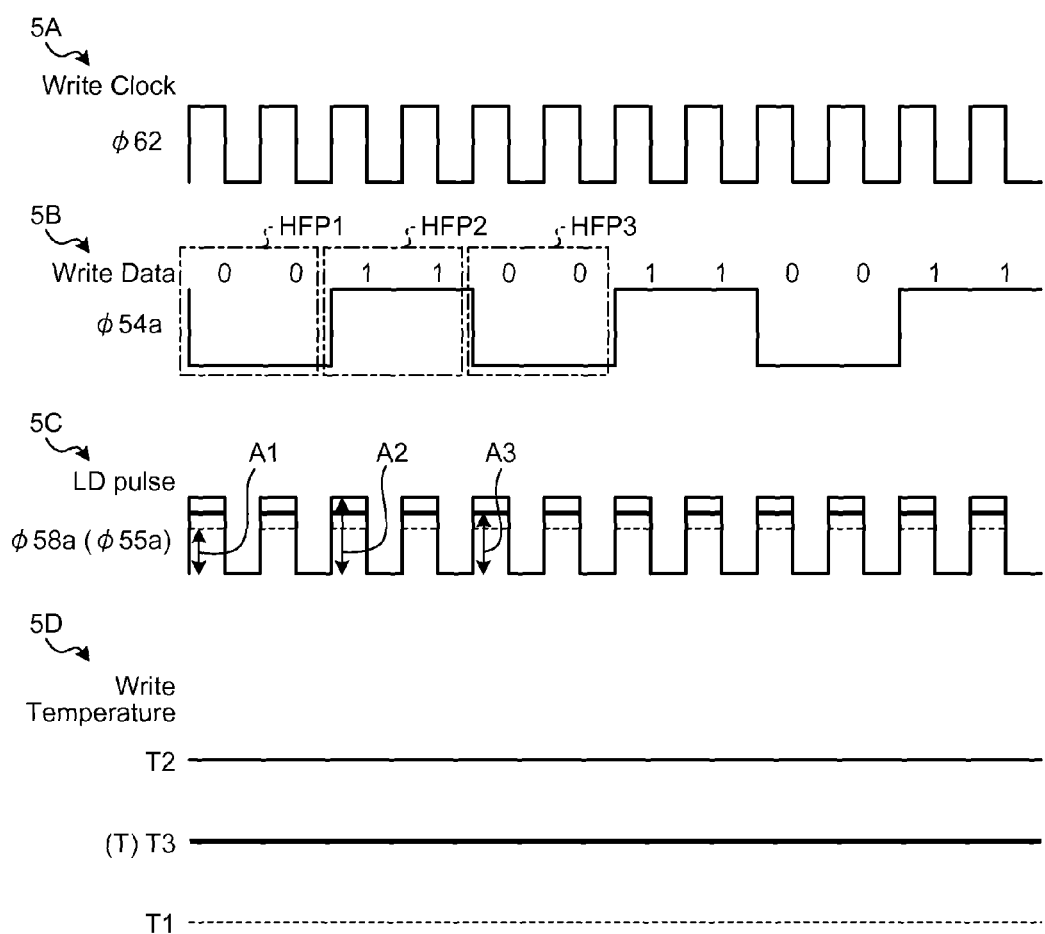
FIG. 5 is a waveform diagram illustrating an operation of the magnetic disk device according to the first embodiment.

For example, the data pattern determiner 303a receives the write data ϕ54 illustrated in FIG. 4B in synchronization with the write clock ϕ62 illustrated in FIG. 4A. FIGS. 4A to 4E are waveform diagrams illustrating signals shown in the RDC 124 and the preamplifier 123. The data pattern determiner 303a determines whether the bit pattern to be recorded is the high frequency pattern HFP or the low frequency pattern LFP, and supplies the determination result to the level setter 303b.

In a case where a modulation discrimination signal indicating a high frequency pattern HFP-3 illustrated in FIG. 4B is received, the level setter 303b generates the thermal-assisted control signal ϕ55 as illustrated in FIG. 4C. In other words, the level setter 303b supplies the thermal-assisted control signal ϕ55 to the driving unit 301 while holding the amplitude of the thermal-assisted control signal ϕ55 to a reference amplitude A according to the amplitude setting value. Therefore, an LD driver 301a of the driving unit 301 generates the LD pulse signal ϕ58 of which the high level is held to the reference level Lref and supplies the LD pulse signal ϕ58 to the light source (LD) 5a.

In a case where a modulation discrimination signal indicating a low frequency pattern LFP-3 illustrated in FIG. 4B is received, the level setter 303b generates the thermal-assisted control signal ϕ55 as illustrated in FIG. 4C. In other words, the level setter 303b supplies the thermal-assisted control signal ϕ55 to the driving unit 301 while attenuating the amplitude of the thermal-assisted control signal ϕ55 from the reference amplitude 'A' in multistep manner at an attenuation rate 'r' according to the attenuation rate setting value. Therefore, the LD driver 301a generates the LD pulse signal ϕ58 of which the high level is lowered from the reference level Lref in multistep manner, and outputs the LD pulse signal ϕ58 to the light source (LD) 5a.

In this way, as illustrated in FIG. 4C, in a case where the high frequency pattern is written in the magnetic disk 50, the LD driver 301a holds the high level of the LD pulse signal ϕ58 to the reference level Lref. Further, in a case where the low frequency pattern is written in the magnetic disk 50, the LD driver 301a of the driving unit 301 lowers the high level of the LD pulse signal ϕ58 from the reference level Lref in multistep manner (the amplitude is attenuated from the reference amplitude 'A' in multistep manner). Therefore, as illustrated in FIG. 4D, when the low frequency pattern of the write data is recorded, the write temperature of the magnetic disk 50 can be lowered from a reference temperature T in multistep manner. As a result, the reinversion in the magnetic particle group of each bit in the low frequency pattern can be suppressed, and the read signal quality can be improved as illustrated in FIG. 4E. In addition, for comparison, FIG. 4E illustrates a waveform of a read signal with the broken line in a case where the write temperature becomes constant with respect to the high frequency pattern and the low frequency pattern. It should be noted that in this specification the expression "lowers . . . signal . . . from the reference level . . . in multistep manner" may mean lowering the signal such that active levels including the reference level constitutes multistep waveform.

It should be noted that, although a period in which the high level is lowered in multistep manner in a case where the low frequency pattern is written in the magnetic disk 50 has been illustrated as one bit period (1T) in FIGS. 4A to 4E, the period may be N (N≥2) bit periods (N×T). In this case, the data pattern determiner 303a can determine a pattern including bits of the same polarity as many as N bit periods immediately after the polarity is inverted as the high frequency pattern. Further, the data pattern determiner 303a can determine a pattern in which bits having the same polarity continue after the continuation of bits having the same polarity during N bit periods since the polarity is inverted as the low frequency pattern.

For example, the period in which the high level is lowered in multistep manner can be set to two bit periods (2T). In this case, the data pattern determiner 303a determines a pattern HFP including bits having the same polarity as many as two bit periods (2T) immediately after the polarity is inverted as the high frequency pattern. The data pattern determiner 303a determines a pattern LFP in which bits having the same polarity continue after the continuation of bits having the same polarity during two bit periods (2T) since the polarity is inverted as the low frequency pattern. In a case where the low frequency pattern LFP is written in the magnetic disk 50, the level setter 303b lowers the high level of the thermal-assisted control signal ϕ55 from the reference level Lref in multistep manner during two bit periods (2T).

In other words, since the period to lower the high level in multistep manner is over a plurality of bit periods, a timing margin of the circuit (for example, the LD driver 301a) in the preamplifier 123 can be easily secured, and the circuit operation in the preamplifier 123 can be stabilized.

In the magnetic disk device 100, the setting parameter used to generate the thermal-assisted control signal ϕ55 can be experimentally acquired and adjusted in advance and set to the preamplifier 123, but the adjusting unit 303 of the preamplifier 123 may have a training function. In a case where the adjusting unit 303 has the training function, the setting parameter can be adjusted in correspondence with a secular change in recording property of the magnetic disk 50, so that the reliability of the read data can be easily improved. Further, in this case, the storage unit 125 can be configured using a volatile memory (a DRAM, an SRAM, and the like) instead of the nonvolatile memory.

Figure 6:
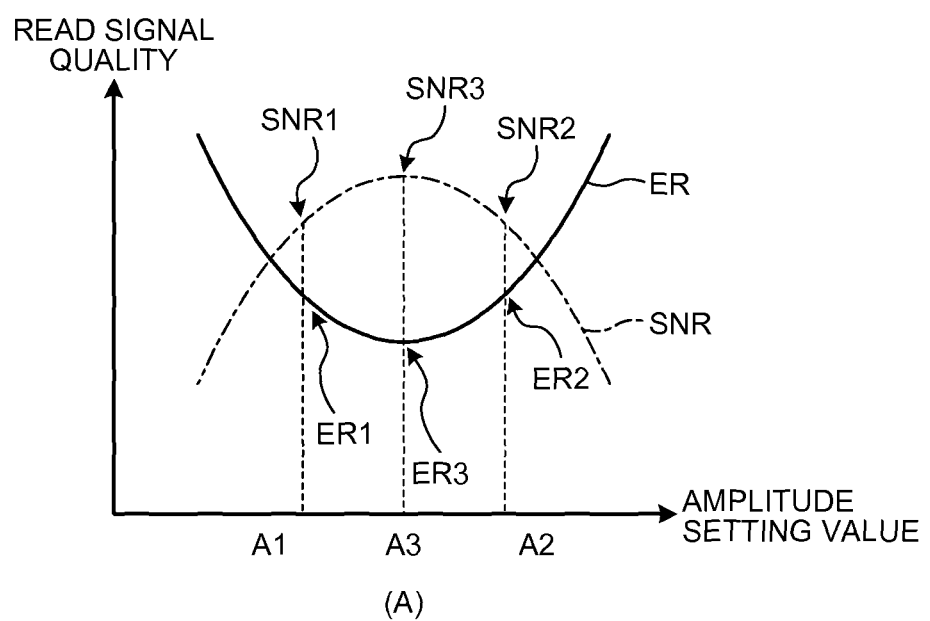
FIG. 6 is a diagram illustrating a relation between a read signal quality and an amplitude setting value in the first embodiment.
Figure 7:
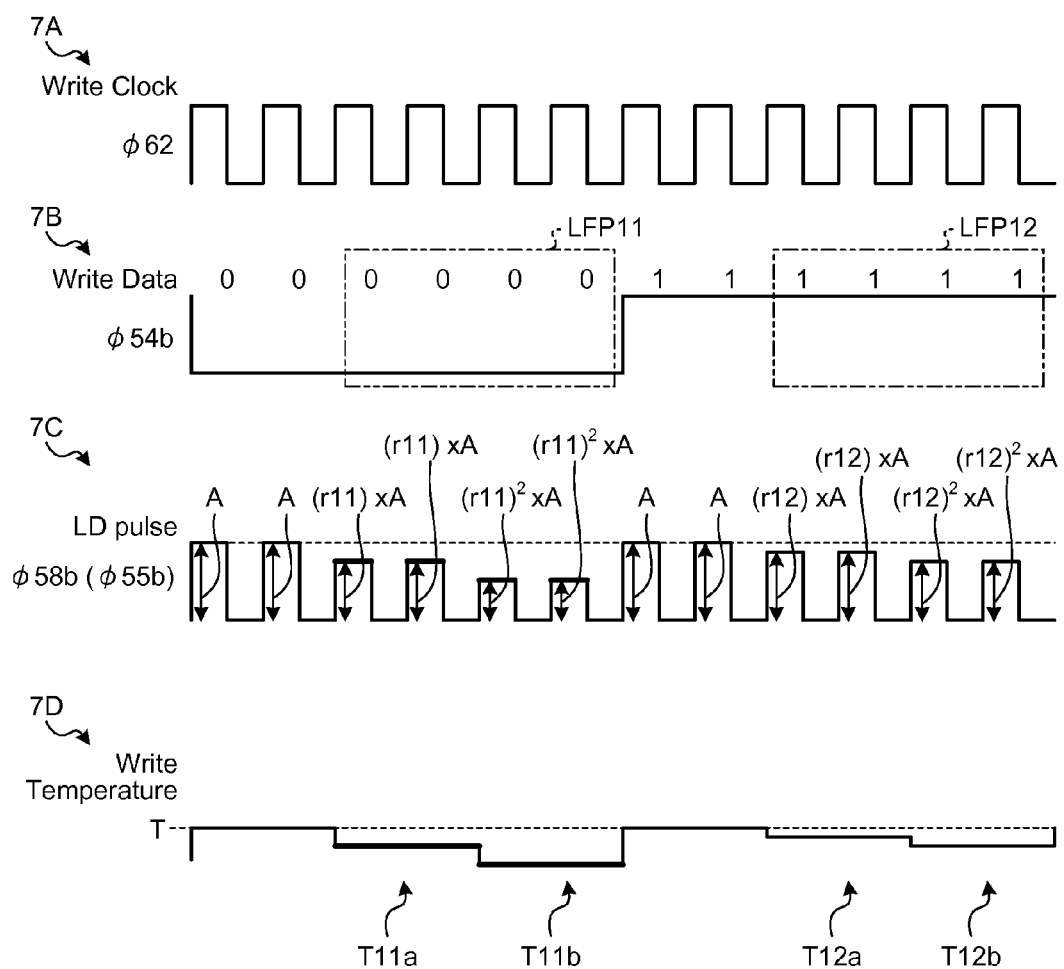
FIG. 7 is a waveform diagram illustrating an operation of the magnetic disk device according to the first embodiment.
Figure 8:
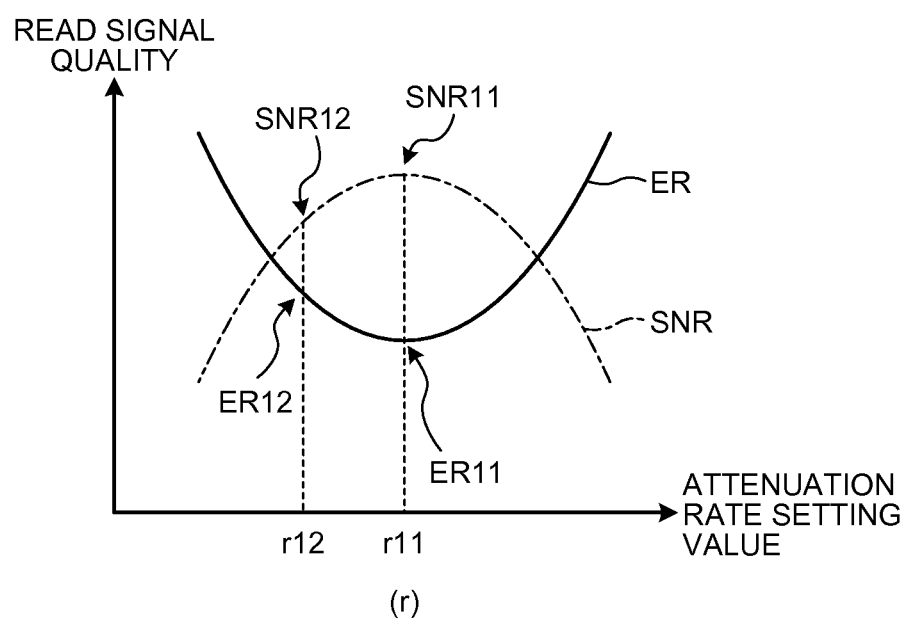
FIG. 8 is a diagram illustrating a relation between a read signal quality and an attenuation rate setting value in the first embodiment.
Figure 9:
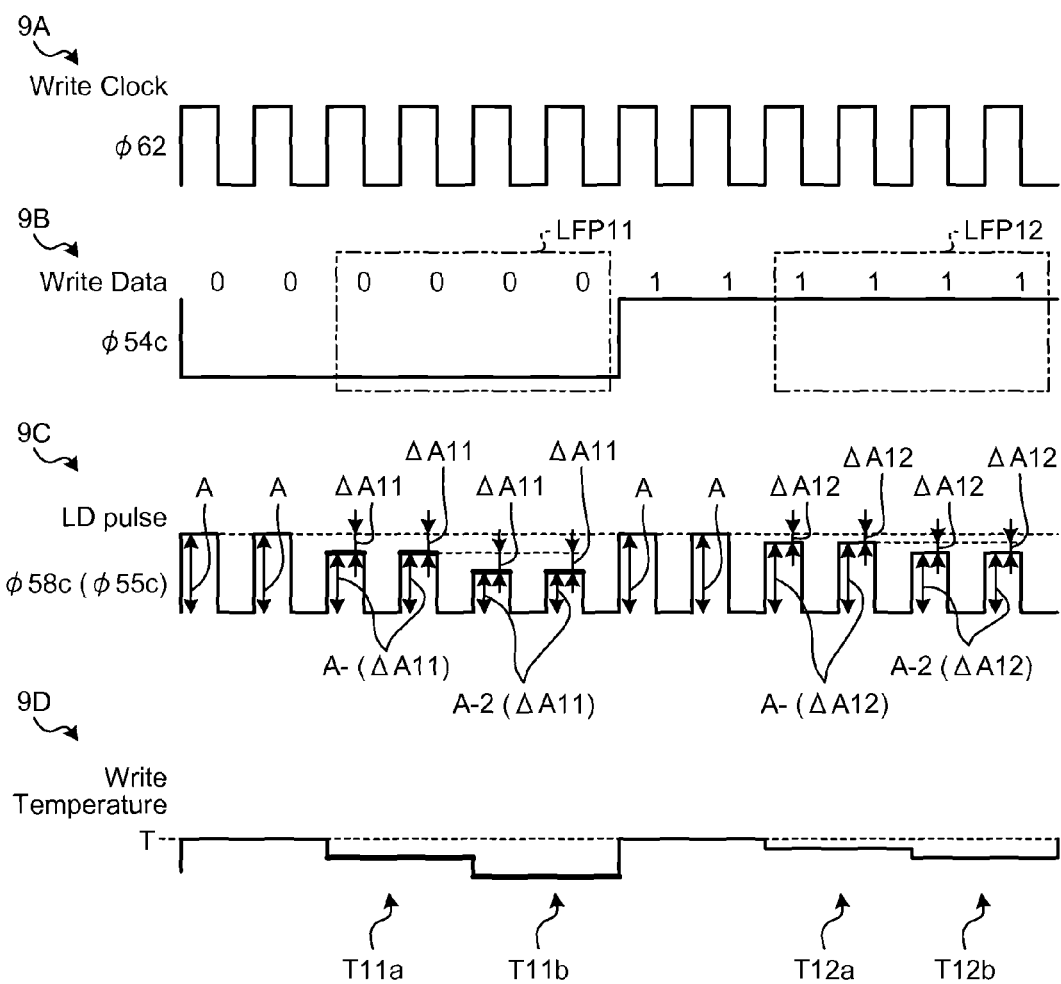
FIG. 9 is a waveform diagram illustrating an operation of a magnetic disk device according to a modified example of the first embodiment.

Herein, the adjustment of the setting parameter to be used for generating the thermal-assisted control signal ϕ55 will be described using FIGS. 5 to 8. FIGS. 5A to 5D are diagrams for describing the adjustment of the reference level Lref. FIGS. 7A to 7D are diagrams for describing the adjustment of the attenuation rate 'r'. FIG. 6 is a diagram illustrating a relation between the read signal quality and the amplitude setting value. FIG. 8 is a diagram illustrating a relation between the read signal quality and the attenuation rate setting value. It should be noted that, although the description will be made about an example of the adjustment of the setting parameter in a case where the period to lower the high level in multistep manner is over two bit periods, the invention can be similarly applied even to a case where the period to lower the high level in multistep manner is over one bit period or three bit periods or more.

First, a method of adjusting the high level (the reference level Lref) of the LD pulse signal for recording the high frequency pattern will be described.

As illustrated in FIGS. 5A to 5D, for the decision of the high level of the LD pulse signal, that is, the reference level Lref, the read signal quality which is obtained when high frequency patterns HFP1 to HFP3 of two bit periods (2T) similarly to the period to lower the high level in multistep manner are recorded is used as an evaluation index, and the high level is adjusted according to the decision. A signal noise ratio (SNR) is used as the read signal quality.

Specifically, in the RDC 124, the data generating circuit 135 generates write data ɸ54a for training which transitions between the high level and the low level during two bit periods (2T) in synchronization with the write clock ɸ62. The data generating circuit 135 writes information according to the write data ɸ54a for training in the magnetic disk 50 through the read/write processing unit 302 and the write head 5w.

At this time, the level setter 303b accesses the storage unit 125 and acquires a plurality of amplitude setting values serving as candidates of the reference amplitude 'A' corresponding to the reference level Lref from the setting parameter group 125a. For example, the level setter 303b acquires amplitude setting values A1, A3, and A2 illustrated in FIG. 5C from the setting parameter group 125a. The level setter 303b selects one of the plurality of amplitude setting values A1, A3, and A2, and adjusts the amplitude of the reference pulse ɸ200 according to the selected amplitude setting value to generate a thermal-assisted control signal ɸ55a. The level setter 303b supplies the generated thermal-assisted control signal ɸ55a to the LD driver 301a. The LD driver 301a drives the light source (LD) 5a in a pulse-like manner according to the driving signal (an LD pulse signal) ɸ58a corresponding to the thermal-assisted control signal ɸ55a.

For example, in a case where the amplitude setting value A1 depicted by the broken line in FIG. 5C is selected, the write temperature of the magnetic disk 50 becomes a write temperature T1 depicted by the broken line in FIG. 5D. In a case where the amplitude setting value A2 depicted by the solid line in FIG. 5C is selected, the high level of the LD pulse signal ɸ58a becomes higher, so that the write temperature of the magnetic disk 50 is increased to be a write temperature T2 depicted by the solid line in FIG. 5D. In a case where the amplitude setting value A3 depicted by the bold line in FIG. 5C is selected, the high level of the LD pulse signal ɸ58a becomes an intermediate level between the amplitude setting value A1 and the amplitude setting value A2, so that the write temperature of the magnetic disk 50 becomes a write temperature T3 depicted by the bold line in FIG. 5D.

Then, the read/write processing unit 302 reads the information according to the write data ɸ54a for training as the read signal ɸ57 from the magnetic disk 50 through the read head 5r. As illustrated in FIG. 3, the RDC 124 further includes a signal quality calculating circuit 164. The signal quality calculating circuit 164 receives the read signal ɸ57 from the read/write processing unit 302. The signal quality calculating circuit 164 extracts a signal component and a noise component from the read signal ɸ57, and calculates an SNR by dividing the signal component by the noise component. The signal quality calculating circuit 164 supplies the calculated SNR to the level setter 303b.

The level setter 303b holds the SNR value supplied from the signal quality calculating circuit 164 for each of the selected amplitude setting values. Therefore, the level setter 303b can accumulate information relating to the read signal quality as depicted by the dashed line in FIG. 6, and determine an amplitude setting value of which the read signal quality falls within an allowance range (for example, an amplitude setting value having the highest SNR value) as the reference amplitude 'A' among the plurality of amplitude setting values. In the case illustrated in FIG. 6, assuming the respective SNR values of the plurality of amplitude setting values A1, A3, and A2 as SNR1, SNR3, and SNR2, the following relation is satisfied.

SNR3>SNR1, and

SNR3>SNR2

Therefore, the amplitude setting value A3 among the plurality of amplitude setting values A1, A3, and A2 can be determined as the reference amplitude 'A'. At this time, the write temperature T3 corresponding to the amplitude setting value A3 becomes the reference temperature 'T'.

In addition, an error rate (ER) may be used as the recording read signal quality instead of the signal noise ratio (SNR). In this case, the signal quality calculating circuit 164 acquires a result of error correction from an error correction circuit (not illustrated) in the RDC 124 to calculate an ER value according to the result of error correction, and supplies the ER value to the level setter 303b. Therefore, the level setter 303b can accumulate information relating to the read signal quality as depicted by the solid line in FIG. 6, and determine an amplitude setting value of which the read signal quality falls within an allowance range (for example, an amplitude setting value having the lowest ER value) as the reference amplitude 'A' among the plurality of amplitude setting values. In the case illustrated in FIG. 6, assuming the respective ER values of the plurality of amplitude setting values A1, A3, and A2 as ER1, ER3, and ER2, the following relation is satisfied.

ER3<ER1, and

ER3<ER2

Therefore, the amplitude setting value A3 among the plurality of amplitude setting values A1, A3, and A2 can be determined as the reference amplitude 'A'. At this time, the write temperature T3 corresponding to the amplitude setting value A3 becomes the reference temperature 'T'.

Next, a method of adjusting an attenuation rate of the amplitude of the LD pulse signal when the low frequency pattern is recorded will be described.

As illustrated in FIGS. 7A to 7D, when the attenuation rate of the amplitude of the LD pulse signal is determined, the recording read signal quality when low frequency patterns LFP11 and LFP12 are recorded after two bit periods (2T) elapse since the polarity of the bit is inverted is used as the evaluation index, and the attenuation rate is adjusted. The SNR is used as the recording read signal quality.

Specifically, in the RDC 124, the data generating circuit 135 generates write data ɸ54b for training which transitions between the high level and the low level during three or more times the period to lower the high level in multistep manner, for example, six bit periods (6T) in synchronization with the write clock ɸ62. The data generating circuit 135 writes information according to the write data ɸ54b for training in the magnetic disk 50 through the read/write processing unit 302 and the write head 5w.

At this time, the level setter 303b accesses the storage unit 125 and acquires a plurality of attenuation rate setting values serving as candidates of the attenuation rate 'r' from the setting parameter group 125a. For example, the level setter 303b acquires attenuation rate setting values r11 and r12 illustrated in FIG. 7C from the setting parameter group 125a. The level setter 303b selects one of the plurality of attenuation rate setting values r11 and r12, and attenuates the amplitude of the reference pulse ɸ200 in multistep manner according to the selected attenuation rate setting value during two bit periods (2T) to generate a thermal-assisted control signal ɸ55b. The level setter 303b supplies the generated thermal-assisted control signal ɸ55b to the LD driver 301a. The LD driver 301a drives the light source (LD) 5a in a pulse-like manner according to the driving signal (an LD pulse signal) ɸ58b corresponding to the thermal-assisted control signal ɸ55b.

For example, in a case where the attenuation rate setting value r11 is selected, the amplitudes of the pulses at the first and second bits after the polarity of the bit is inverted become the reference amplitude 'A' in the LD pulse signal φ58b. Further, the amplitudes of the pulses at the third and fourth bits become (r11)×A as depicted with the bold line in FIG. 7C. Furthermore, as depicted with the bold line in FIG. 7C, the amplitudes of the pulses at the fifth and sixth bits become (r11)²×A. In this regard, as depicted with the bold line in FIG. 7D, the write temperature of the magnetic disk 50 is lowered in multistep manner (reference temperature T→write temperature T11a→write temperature T11b) during two bit periods (2T).

Further, in a case where the attenuation rate setting value r12 is selected, the amplitudes of the pulses at the first and second bits after the polarity of the bit is inverted become the reference amplitude 'A' in the LD pulse signal φ58b. Further, as depicted with the solid line in FIG. 7C, the amplitudes of the pulses at the third and fourth bits become (r12)×A. Furthermore, as depicted with the solid line in FIG. 7C, the amplitudes of the pulses at the fifth and sixth bits become (r12)²×A. In other words, since the attenuation rate of the amplitude of the LD pulse signal φ58b becomes smaller, the write temperature of the magnetic disk 50 is changed in a smaller dynamic range as depicted with the solid line in FIG. 7D. In other words, the write temperature is lowered in a smaller dynamic range in multistep manner (reference temperature T→write temperature T12a→write temperature T12b) during two bit periods (2T).

Then, the read/write processing unit 302 reads the information according to the write data φ54b for training as the read signal φ57 from the magnetic disk 50 through the read head 5r. The signal quality calculating circuit 164 receives the read signal φ57 from the read/write processing unit 302. The signal quality calculating circuit 164 extracts a signal component and a noise component from the read signal φ57, and calculates an SNR by dividing the signal component by the noise component. The signal quality calculating circuit 164 supplies the calculated SNR to the level setter 303b.

The level setter 303b holds the SNR value supplied from the signal quality calculating circuit 164 for each of the selected attenuation rate setting values. Therefore, the level setter 303b can accumulate information relating to the read signal quality as depicted by the dashed line in FIG. 8, and determine an amplitude setting value of which the read signal quality falls within an allowance range (for example, an amplitude setting value having the highest SNR value) as the attenuation rate 'r' among the plurality of attenuation rate setting values. In the case illustrated in FIG. 8, assuming the respective SNR values of the plurality of attenuation rate setting values r11 and r12 as SNR11 and SNR12, the following relation is satisfied.

SNR11>SNR12

Therefore, the attenuation rate setting value r11 among the plurality of attenuation rate setting values r11 and r12 can be determined as the attenuation rate 'r'.

In addition, an error rate (ER) may be used as the recording read signal quality instead of the signal noise ratio (SNR). In this case, the signal quality calculating circuit 164 acquires a result of error correction from an error correction circuit (not illustrated) in the RDC 124 to calculate an ER value according to the result of error correction, and supplies the ER value to the level setter 303b. Therefore, the level setter 303b can accumulate information relating to the read signal quality as depicted by the solid line in FIG. 8, and determine an amplitude setting value of which the read signal quality falls within an allowance range (for example, an amplitude setting value having the lowest ER value) as the attenuation rate 'r' among the plurality of amplitude setting values. In the case illustrated in FIG. 8, assuming the respective ER values of the plurality of attenuation rate setting values r11 and r12 as ER11 and ER12, the following relation is satisfied.

ER11<ER12

Therefore, the attenuation rate setting value r11 among the plurality of attenuation rate setting values r11 and r12 can be determined as the attenuation rate 'r'.

As described above, in the preamplifier 123 of the magnetic disk device 100 according to the first embodiment, when the high frequency pattern is recorded into the magnetic disk 50, the driving unit 301 holds the high level of the LD pulse signal φ58 to the reference level Lref. When the low frequency pattern is recorded into the magnetic disk 50, the driving unit 301 lowers the high level of the LD pulse signal φ58 from the reference level Lref in multistep manner. Therefore, since the reinversion in the magnetic particle group of each bit can be suppressed in the recording area of the low frequency pattern of the magnetic disk 50, the reliability of the data to be written in the magnetic disk 50 can be improved, and the read signal quality can be improved.

Further, in the preamplifier 123 of the magnetic disk device 100 according to the first embodiment, when the low frequency pattern is recorded into the magnetic disk 50, the driving unit 301 attenuates the amplitude of the LD pulse signal φ58 at a predetermined attenuation rate 'r' in multistep manner. Therefore, when the low frequency pattern is recorded into the magnetic disk 50, the high level of the LD pulse signal φ58 can be lowered from the reference level Lref in multistep manner.

Further, in the preamplifier 123 of the magnetic disk device 100 according to the first embodiment, the adjusting unit 303 adjusts a parameter to lower the high level of the LD pulse signal φ58 in multistep manner according to the read signal quality of the recorded write data. For example, the adjusting unit 303 adjusts the attenuation rate 'r' to attenuate the amplitude of the LD pulse signal φ58 in multistep manner according to the read signal quality. When the low frequency pattern is recorded into the magnetic disk 50, the driving unit 301 lowers the high level of the LD pulse signal φ58 from the reference level Lref in multistep manner according to the parameter adjusted by the adjusting unit 303. For example, when the low frequency pattern is recorded into the magnetic disk 50, the driving unit 301 attenuates the amplitude of the LD pulse signal φ58 in multistep manner at the attenuation rate 'r' adjusted by the adjusting unit 303. Therefore, since the setting parameter can be adjusted in correspondence with a secular change of the recording property of the magnetic disk 50, the reliability of the read data can be easily improved.

It should be noted that, although the laser diode is given as an example of the light source 5a for a thermal-assisted magnetic recording, the light source 5a may employ light emitting elements besides the laser diode as long as the light emitting element can generate light for an application of the thermal-assisted magnetic recording.

Further, the SNR or the ER are given as examples of the read signal quality used in the adjustment of the reference level illustrated in FIGS. 5A to 5D and the adjustment of the attenuation rate illustrated in FIGS. 7A to 7D, other indexes may be used as long as the index represents the read signal quality. For example, a viterbi metric margin (VMM), a log-likelihood ratio (LLR), an asymmetry or the like may be used as the read signal quality.

Further, the adjustment of the reference level illustrated in FIGS. 5A to 5D and the adjustment of the attenuation rate illustrated in FIGS. 7A to 7D may be performed for each zone in a case where the magnetic disk 50 is divided into a plurality of zones. The plurality of zones, for example, can be provided by concentrically dividing the magnetic disk 50 from its center.

Further, when the low frequency pattern is recorded into the magnetic disk 50, the driving unit 301 may attenuate the amplitude of the LD pulse signal ϕ58 by a predetermined attenuation amount ΔA in multistep manner instead of attenuating the amplitude of the LD pulse signal ϕ58 at the predetermined attenuation rate 'r' in multistep manner. Even in this case, when the low frequency pattern is recorded into the magnetic disk 50, the high level of the LD pulse signal ϕ58 can be lowered from the reference level Lref in multistep manner.

In this case, although a method of adjusting the attenuation amount of the amplitude is basically similar to that of the attenuation rate illustrated in FIGS. 7A to 7D, the method is different in the following points as illustrated in FIGS. 9A to 9D.

The level setter 303b accesses the storage unit 125 and acquires a plurality of attenuation amount setting values serving as candidates of the attenuation amount ΔA from the setting parameter group 125a. For example, the level setter 303b acquires attenuation amount setting values ΔA11 and ΔA12 illustrated in FIG. 9C from the setting parameter group 125a. The level setter 303b selects one of the plurality of attenuation amount setting values ΔA11 and ΔA12, and attenuates the amplitude of the reference pulse ϕ200 according to the selected attenuation amount setting value in multistep manner during two bit periods (2T) so as to generate a thermal-assisted control signal ϕ55c. The level setter 303b supplies the generated thermal-assisted control signal ϕ55c to the LD driver 301a. The LD driver 301a drives the light source (LD) 5a in a pulse-like manner according to the driving signal (an LD pulse signal) ϕ58c corresponding to the thermal-assisted control signal ϕ55c.

For example, in a case where the attenuation amount setting value ΔA11 is selected, the amplitudes of the pulses at the first and second bits after the polarity of the bit is inverted become the reference amplitude 'A' in the LD pulse signal ϕ58c. Further, the amplitudes of the pulses at the third and fourth bits become A−(ΔA11) as depicted with the bold line in FIG. 9C. Furthermore, the amplitudes of the pulses at the fifth and sixth bits become A−2×(ΔA11) as depicted with the bold line in FIG. 9C.

Further, in a case where the attenuation amount setting value ΔA12 is selected, the amplitudes of the pulses at the first and second bits after the polarity of the bit is inverted become the reference amplitude 'A' in the LD pulse signal ϕ58c. Further, as depicted with the solid line in FIG. 9C, the amplitudes of the pulses at the third and fourth bits become A−(ΔA12). Furthermore, as depicted with the solid line in FIG. 9C, the amplitudes of the pulses at the fifth and sixth bits become A−2×(ΔA12).

Then, the level setter 303b holds the SNR value supplied from the signal quality calculating circuit 164 for each of the selected attenuation amount setting values. Therefore, the level setter 303b can determine an amplitude setting value of which the read signal quality falls within an allowance range (for example, an amplitude setting value having the highest SNR value) as the attenuation amount ΔA among the plurality of attenuation amount setting values. For example, assuming the SNR values of the plurality of attenuation rate setting values ΔA11 and ΔA12 as SNR11 and SNR12, the following relation is satisfied.

SNR11>SNR12

In this case, the attenuation rate setting value ΔA11 among the plurality of attenuation rate setting values ΔA11 and ΔA12 can be determined as the attenuation amount ΔA.

(Second Embodiment)

Next, a magnetic disk device 100 according to a second embodiment will be described. In the following, the description will be made focusing on portions different from the first embodiment.

In the first embodiment, the amplitude of the LD pulse signal ϕ58 is attenuated in multistep manner to lower the high level in multistep manner, but in the second embodiment, the center of the amplitude of the LD pulse signal ϕ58 is lowered in multistep manner to lower the high level in multistep manner.

Figure 10:
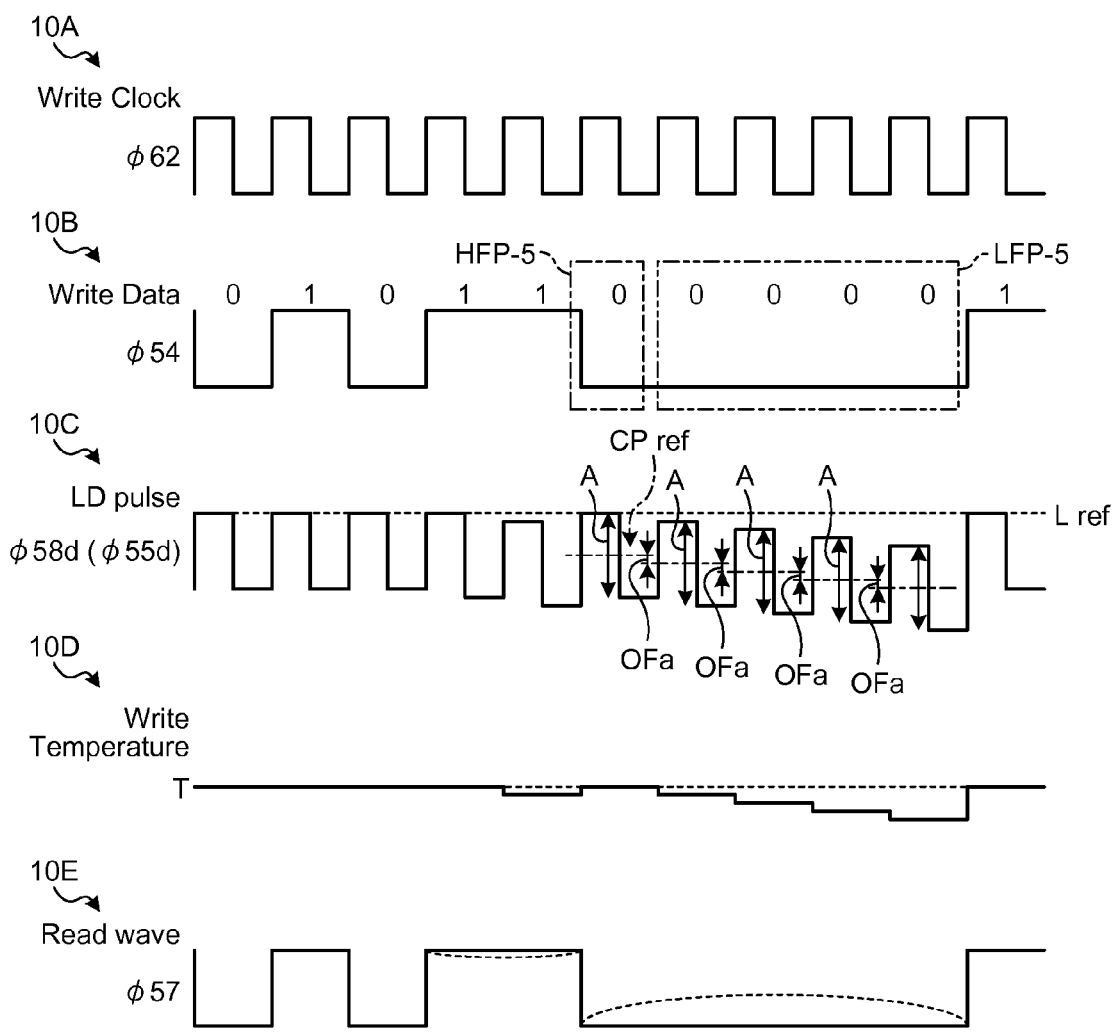
FIG. 10 is a waveform diagram illustrating an operation of a magnetic disk device according to a second embodiment.
Figure 11:
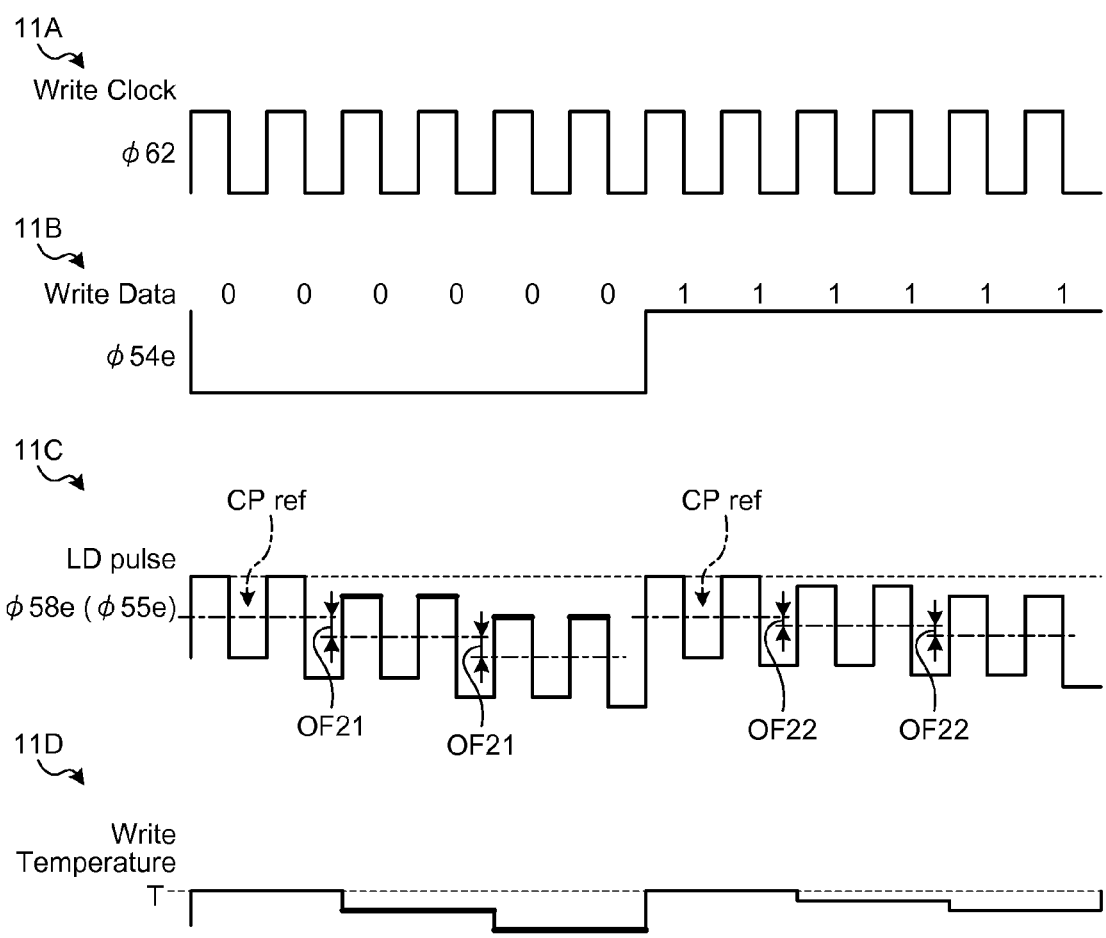
FIG. 11 is a waveform diagram illustrating an operation of the magnetic disk device according to the second embodiment.

Specifically, in the adjusting unit 303 of the preamplifier 123, in a case where a modulation discrimination signal indicating a high frequency pattern HFP-5 illustrated in FIG. 10B is received, the level setter 303b (see FIG. 3) generates a thermal-assisted control signal ϕ55d as illustrated in FIG. 10C. In other words, the level setter 303b holds the center of the amplitude of the thermal-assisted control signal ϕ55d to a reference center position CPref according to a center setting value, and supplies the thermal-assisted control signal ϕ55d to the driving unit 301. Therefore, the LD driver 301a of the driving unit 301 generates an LD pulse signal ϕ58d such that the high level is held to the reference level Lref, and supplies the LD pulse signal ϕ58d to the light source (LD) 5a.

In a case where a modulation discrimination signal indicating a low frequency pattern LFP-5 illustrated in FIG. 10B is received, the level setter 303b generates the thermal-assisted control signal ϕ55d as illustrated in FIG. 10C. In other words, the level setter 303b lowers the center of the amplitude of the thermal-assisted control signal ϕ55d from the reference center position CPref in multistep manner by an offset amount OFa according to an offset setting value, and supplies the thermal-assisted control signal ϕ55d to the driving unit 301. Therefore, the LD driver 301a of the driving unit 301 generates the LD pulse signal ϕ58d such that the high level is lowered from the reference level Lref in multistep manner, and supplies the LD pulse signal ϕ58d to the light source (LD) 5a.

It should be noted that although a period in which the high level is lowered in multistep manner in a case where the low frequency pattern is written in the magnetic disk 50 has been illustrated as one bit period (1T) in FIGS. 10A to 10E, the period may be N (N≥2) bit periods (N×T). For example, the period in which the high level is lowered in multistep manner can be set to two bit periods (2T). In this case, when the low frequency pattern is written into the magnetic disk 50, the level setter 303b lowers the center of the amplitude of the thermal-assisted control signal ϕ55d from the reference center position CPref in multistep manner by the offset amount OF every two bit periods (2T). In other words, since the period to lower the high level in multistep manner is over a plurality of bit periods, a timing margin of the circuit (for example, the LD driver 301a) in the preamplifier 123 can be easily secured, and the circuit operation in the preamplifier 123 can be stabilized.

Further, a method of adjusting the offset amount is basically similar to that of the attenuation rate illustrated in FIGS. 7A to 7D, but both adjustments are different in the following points as illustrated in FIGS. 11A to 11D.

The level setter 303b accesses the storage unit 125 and acquires a plurality of offset amount setting values serving as candidates of the offset amount OF from the setting parameter group 125a. For example, the level setter 303b acquires offset amounts OF21 and OF22 illustrated in FIG. 11C from the setting parameter group 125a. The level setter 303b selects one of the plurality of offset amount setting values OF21 and OF22, and lowers the center of the amplitude of the reference pulse φ200 from the reference center position CPref in multistep manner during two bit periods (2T) according to the selected offset amount setting value so as to generate a thermal-assisted control signal φ55e. The level setter 303b supplies the generated thermal-assisted control signal φ55e to the LD driver 301a. The LD driver 301a drives the light source (LD) 5a in a pulse-like manner according to the driving signal (an LD pulse signal) φ58e corresponding to the thermal-assisted control signal φ55e.

For example, in a case where the offset amount setting value OF21 is selected, the centers of the amplitudes of the pulses at the first and second bits after the polarity of the bit is inverted become the reference center position CPref in the LD pulse signal φ58e. Further, the centers of the amplitudes of the pulses at the third and fourth bits become CPref−(OF21) as depicted with the bold line in FIG. 11C. Furthermore, the centers of the amplitudes of the pulses at the fifth and sixth bits become CPref−2×(OF21) as depicted with the bold line in FIG. 11C.

Further, in a case where the offset amount setting value OF22 is selected, the centers of the amplitudes of the pulses at the first and second bits after the polarity of the bit is inverted become the reference center position CPref in the LD pulse signal φ58e. Further, as depicted with the solid line in FIG. 11C, the centers of the amplitudes of the pulses at the third and fourth bits become CPref−(OF22). Furthermore, as depicted with the solid line in FIG. 11C, the centers of the amplitudes of the pulses at the fifth and sixth bits become CPref−2×(OF22).

Then, the level setter 303b holds the SNR value supplied from the signal quality calculating circuit 164 for each of the selected offset amount setting values. Therefore, the level setter 303b can determine an amplitude setting value of which the read signal quality falls within an allowance range (for example, an amplitude setting value having the highest SNR value) as the offset amount OF among the plurality of offset amount setting values. For example, assuming the SNR values of the plurality of offset amount setting values OF21 and OF22 as SNR21 and SNR22, the following relation is satisfied.

SNR21>SNR22

In this case, the offset amount setting value OF21 among the plurality of offset amount setting values OF21 and OF22 can be determined as the offset amount OF.

As described above, in the preamplifier 123 of the magnetic disk device 100 according to the second embodiment, when the low frequency pattern is recorded into the magnetic disk 50, the driving unit 301 lowers the center of the amplitude of the LD pulse signal φ58 in multistep manner by the predetermined offset amount OF. Therefore, when the low frequency pattern is recorded into the magnetic disk 50, the high level of the LD pulse signal φ58 can be lowered from the reference level Lref in multistep manner.

Further, in the preamplifier 123 of the magnetic disk device 100 according to the second embodiment, the adjusting unit 303 adjusts the offset amount OF to lower the center of the amplitude of the LD pulse signal φ58 in multistep manner according to the read signal quality. When the low frequency pattern is recorded into the magnetic disk 50, the driving unit 301 lowers the center of the amplitude of the LD pulse signal φ58 in multistep manner by the offset amount OF which is adjusted by the adjusting unit 303. Therefore, since the setting parameter can be adjusted in correspondence with a secular change of the recording property of the magnetic disk 50, the reliability of the read data can be easily improved.

(Third Embodiment)

Next, the magnetic disk device 100 according to a third embodiment will be described. In the following, the description will be made focusing on portions different from the first embodiment.

In the first and second embodiments, the case where the driving unit 301 drives the light source 5a in a pulse-like manner has been given as an example, but in the third embodiment, a case where the driving unit 301 drives the light source 5a in a DC-like manner will be given as an example.

Figure 12:
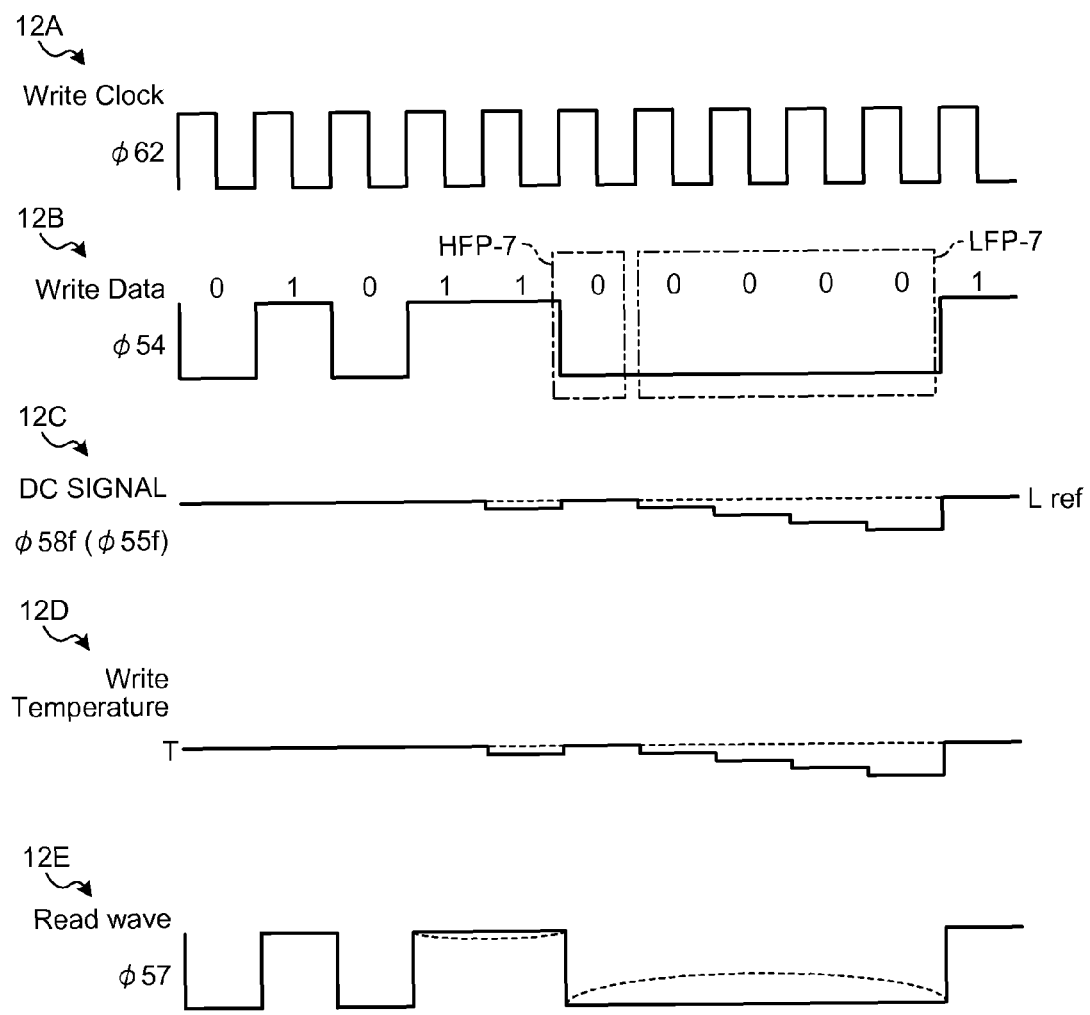
FIG. 12 is a waveform diagram illustrating an operation of a magnetic disk device according to a third embodiment.

Specifically, in the adjusting unit 303 of the preamplifier 123, in a case where a modulation discrimination signal indicating a high frequency pattern HFP-7 illustrated in FIG. 12B is received, the level setter 303b (see FIG. 3) generates the thermal-assisted control signal φ55f as illustrated in FIG. 12C. In other words, the level setter 303b shapes the thermal-assisted control signal φ55f into a DC-like signal and holds a DC level of the thermal-assisted control signal φ55f to the reference level Lref, and supplies the thermal-assisted control signal φ55f to the driving unit 301. Therefore, the LD driver 301a of the driving unit 301 generates the driving signal (DC signal) φ58f such that the DC level is held to the reference level Lref, and supplies the driving signal φ58f to the light source (LD) 5a.

In a case where a modulation discrimination signal indicating a low frequency pattern LFP-7 illustrated in FIG. 12B is received, the level setter 303b generates the thermal-assisted control signal φ55f as illustrated in FIG. 12C. In other words, the level setter 303b shapes the thermal-assisted control signal φ55 into a DC-like signal, lowers the DC level of the thermal-assisted control signal φ55f from the reference level Lref in multistep manner at the attenuation rate 'r' (see FIGS. 4A to 4E) according to the attenuation rate setting value, and supplies the thermal-assisted control signal φ55f to the driving unit 301. Therefore, the LD driver 301a of the driving unit 301 generates the driving signal (DC signal) φ58f such that the DC level is lowered from the reference level Lref in multistep manner and supplies the driving signal φ58f to the light source (LD) 5a.

It should be noted that a method of adjusting the attenuation rate of the DC level is similar to that of the attenuation rate in the first and second embodiments.

As described above, in the preamplifier 123 of the magnetic disk device 100 according to the third embodiment, when the low frequency pattern is recorded into the magnetic disk 50, the driving unit 301 lowers the DC level in multistep manner at the predetermined attenuation rate 'r'. Therefore, when the low frequency pattern is recorded into the magnetic disk 50, the DC level of the driving signal (DC signal) φ58 of the light source 5a can be lowered from the reference level Lref in multistep manner.

Further, in the preamplifier 123 of the magnetic disk device 100 according to the third embodiment, the adjusting unit 303 adjusts the attenuation rate 'r' to lower the DC level in multistep manner according to the read signal quality of the recorded write data. When the low frequency pattern is recorded into the magnetic disk 50, the driving unit 301 lowers the DC level in multistep manner at the attenuation rate 'r' adjusted by the adjusting unit 303. Therefore, since the setting parameter can be adjusted in correspondence with a secular change of the recording property of the magnetic disk 50, the reliability of the read data can be easily improved.

It should be noted that, when the low frequency pattern is recorded into the magnetic disk 50, the driving unit 301 may lower the DC level in multistep manner at the predetermined attenuation amount ΔA instead of lowering the DC level in multistep manner at the predetermined attenuation rate 'r'. Even in this case, when the low frequency pattern is recorded into the magnetic disk 50, the DC level of the driving signal (DC signal) φ58 of the light source 5a can be lowered from the reference level Lref in multistep manner. In this case, a method of adjusting the attenuation amount of the DC level is similar to that of the attenuation amount in a modified example of the first embodiment.

(Fourth Embodiment)

Next, a magnetic disk device 100 according to a fourth embodiment will be described. In the following, the description will be made focusing on portions different from the first embodiment.

In the first embodiment, the case where the adjusting unit 303 is provided in the preamplifier 123 has been given as an example, but in the fourth embodiment, a case where the adjusting unit 303 is provided in the RDC 124 will be given as an example.

Figure 13:
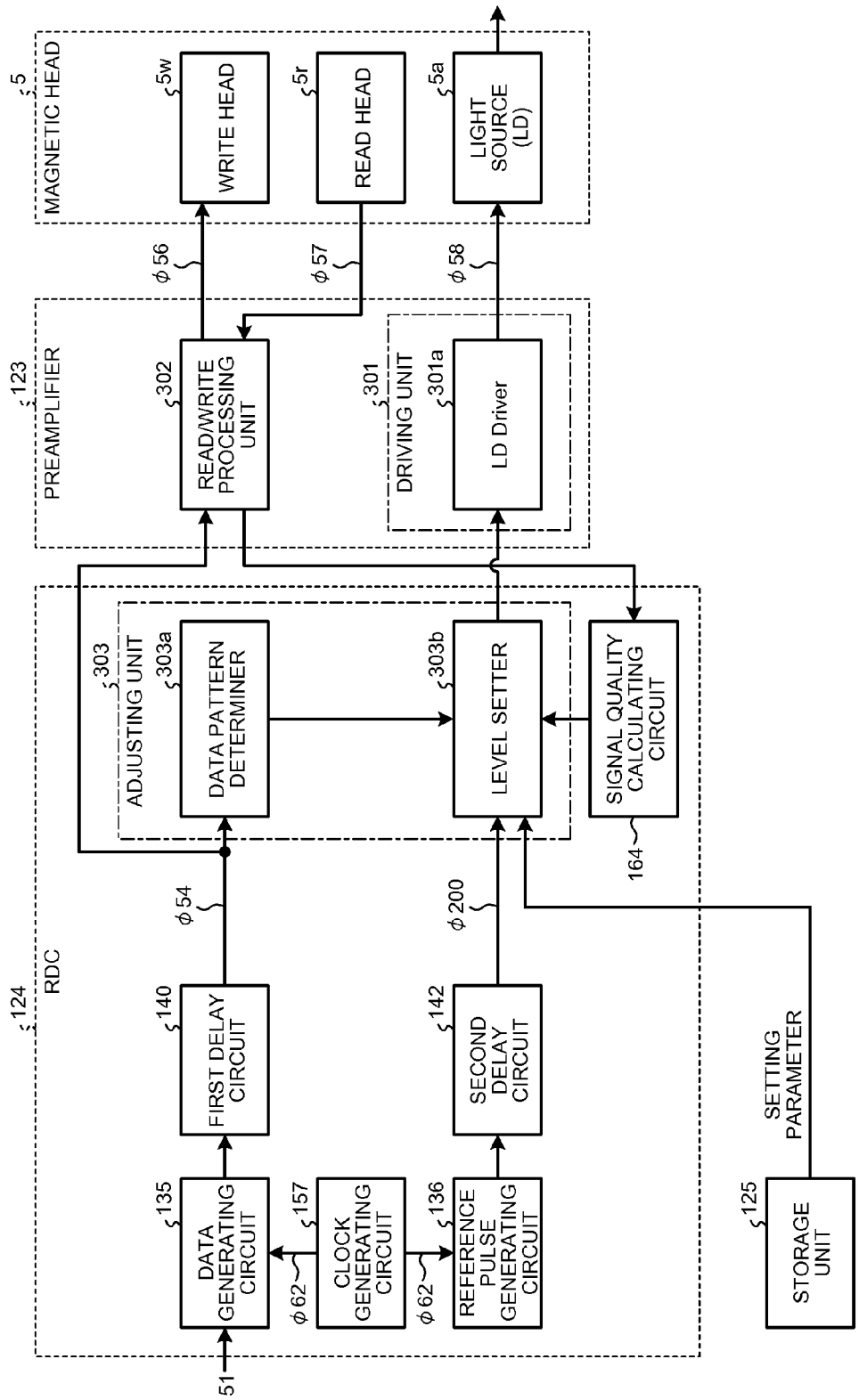
FIG. 13 is a diagram illustrating configurations of an RDC and a preamplifier in a fourth embodiment.

Specifically, as illustrated in FIG. 13, the preamplifier 123 does not include the adjusting unit 303. Instead, the RDC 124 includes the adjusting unit 303. In this case, since the signal quality calculating circuit 164 can be disposed near the adjusting unit 303, it is possible to transfer a signal from the signal quality calculating circuit 164 to the adjusting unit 303 at a high rate.

Further, in a case where the adjusting unit 303 is provided in the RDC 124, a clock signal can be easily generated at a high rate compared to the case where the adjusting unit 303 is provided in the preamplifier 123. For example, the LD pulse signal can be generated at a higher frequency using the clock having a rate higher than that of the write clock. Therefore, the process of lowering the high level of the driving signal (the LD pulse signal) φ58 of the light source 5a from the reference level Lref in multistep manner can be performed in a fine unit of time.

Furthermore, since there is no need to transfer a calculation result of the signal quality calculating circuit 164 to the preamplifier 123, it is possible to reduce the number of transmission lines between the RDC 124 and the preamplifier 123.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a light irradiation element configured to irradiate a magnetic disk with light according to a driving signal; and
a control unit configured to adjust a parameter to lower active level of the driving signal contributing intensity of the light according to a read signal quality when write data is recorded into the magnetic disk and is read, and configured to lower, in multistep manner, the active level of the driving signal according to the adjusted parameter when a low frequency pattern of the write data is recorded into the magnetic disk.

2. The magnetic disk device according to claim 1, wherein the control unit drives a pulse signal as the driving signal, adjusts an attenuation rate as the parameter to attenuate an amplitude of the pulse signal according to a read signal quality, and attenuates, in multistep manner, the amplitude of the pulse signal by the adjusted attenuation rate when the low frequency pattern of the write data is recorded into the magnetic disk.

3. The magnetic disk device according to claim 1, wherein the control unit drives a pulse signal as the driving signal, adjusts an attenuation amount as the parameter to lower an amplitude of the pulse signal according to a read signal quality, and attenuates, in multistep manner, the amplitude of the pulse signal by the adjusted attenuation amount when the low frequency pattern of the write data is recorded into the magnetic disk.

4. The magnetic disk device according to claim 1, wherein the control unit drives a pulse signal as the driving signal, adjusts an offset amount as the parameter to lower center of an amplitude of the pulse signal according to a read signal quality, and lowers, in multistep manner, the center of the amplitude of the pulse signal by the adjusted offset amount when the low frequency pattern of the write data is recorded into the magnetic disk.

5. The magnetic disk device according to claim 1, wherein the control unit drives a DC signal as the driving signal, adjusts an attenuation rate as the parameter to lower a level of the DC signal according to a read signal quality, and lowers, in multistep manner, the level of the DC signal by the adjusted attenuation rate when the low frequency pattern of the write data is recorded into the magnetic disk.

6. The magnetic disk device according to claim 1, wherein the control unit drives a DC signal as the driving signal, adjusts an attenuation amount as the parameter to lower a level of the DC signal according to a read signal quality, and lowers, in multistep manner, the level of the DC signal by the adjusted attenuation amount when the low frequency pattern of the write data is recorded into the magnetic disk.

7. A preamplifier which controls a driving signal in a magnetic disk device including a light irradiation element to irradiate the magnetic disk with light according to a driving signal,
the preamplifier comprising:
a control unit configured to adjust a parameter to lower active level of the driving signal contributing intensity of the light according to a read signal quality when write data is recorded into the magnetic disk and is read, and configured to lower, in multistep manner, the active level of the driving signal according to the adjusted parameter when a low frequency pattern of the write data is recorded into the magnetic disk; and
a driving unit configured to supply the driving signal controlled by the control unit to the light irradiation element.

8. The preamplifier according to claim 7, wherein
the driving unit drives a pulse signal as the driving signal,
the control unit adjusts an attenuation rate as the parameter to attenuate an amplitude of the pulse signal according to a read signal quality, and
the driving unit attenuates, in multistep manner, the amplitude of the pulse signal by the adjusted attenuation rate when the low frequency pattern of the write data is recorded into the magnetic disk.

9. The preamplifier according to claim 7, wherein
the driving unit drives a pulse signal as the driving signal,
the control unit adjusts an attenuation amount as the parameter to lower an amplitude of the pulse signal according to a read signal quality, and
the driving unit attenuates, in multistep manner, the amplitude of the pulse signal by the adjusted attenuation amount when the low frequency pattern of the write data is recorded into the magnetic disk.

10. The preamplifier according to claim 7, wherein
the driving unit drives a pulse signal as the driving signal,
the control unit adjusts an offset amount as the parameter to lower center of the pulse signal according to a read signal quality, and
the driving unit lowers, in multistep manner, the center of the amplitude of the pulse signal by the adjusted offset amount when the low frequency pattern of the write data is recorded into the magnetic disk.

11. The preamplifier according to claim 7, wherein
the driving unit drives a DC signal as the driving signal,
the control unit adjusts an attenuation rate as the parameter to lower a level of the DC signal according to a read signal quality, and
the driving unit lowers, in multistep manner, the level of the DC signal by the adjusted attenuation rate when the low frequency pattern of the write data is recorded into the magnetic disk.

12. The preamplifier according to claim 7, wherein
the driving unit drives a DC signal as the driving signal,
the control unit adjusts an attenuation amount as the parameter to lower a level of the DC signal according to a read signal quality, and
the driving unit lowers, in multistep manner, the level of the DC signal by the adjusted attenuation amount when the low frequency pattern of the write data is recorded into the magnetic disk.

13. A control method of controlling a magnetic disk device, the method comprising:
adjusting a parameter to lower active level of a driving signal of a light irradiation element according to a read signal quality when write data is recorded into a magnetic disk and is read, the light irradiation element being configured to irradiate a magnetic disk with light, the active level contributing intensity of the light; and
lowering, in multistep manner, the active level of the driving signal according to the adjusted parameter when a low frequency pattern of the write data is recorded into the magnetic disk.

* * * * *